United States Patent [19]

Kavanaugh

[11] Patent Number: 5,683,786

[45] Date of Patent: Nov. 4, 1997

[54] MICROSCOPE SLIDE HAVING BAR CODE INDICIA INSCRIBED THEREON

[75] Inventor: Christopher P. Kavanaugh, Oklahoma City, Okla.

[73] Assignee: Health Card Technologies, Inc., Oklahoma City, Okla.

[21] Appl. No.: 638,069

[22] Filed: Apr. 25, 1996

[51] Int. Cl.$^6$ .................................................. B32B 9/00
[52] U.S. Cl. .................. 428/195; 428/147; 428/172; 428/187; 428/192; 428/204; 428/206; 428/210; 428/212; 428/327; 428/426; 427/165; 427/270; 356/244; 350/534
[58] Field of Search ........................ 428/204, 172, 428/206, 210, 212, 192, 147, 187, 195, 327, 203, 426; 427/165, 270; 356/244; 350/534

[56] References Cited

U.S. PATENT DOCUMENTS

| | | | |
|---|---|---|---|
| 4,159,875 | 7/1979 | Hauser | 356/244 |
| 4,323,755 | 4/1982 | Nierenberg | 219/121 |
| 4,327,283 | 4/1982 | Heyman et al. | 235/487 |
| 4,481,246 | 11/1984 | Melisz et al. | 428/210 |
| 4,515,867 | 5/1985 | Bleacher et al. | 428/204 |
| 4,624,882 | 11/1986 | Melisz et al. | 428/210 |
| 4,679,914 | 7/1987 | Rosenberg | 350/534 |
| 5,089,315 | 2/1992 | Rosenberg | 428/192 |
| 5,111,344 | 5/1992 | Robinson, Jr. | 359/900 |
| 5,298,717 | 3/1994 | DeRossett, Jr. | 219/121.68 |
| 5,331,443 | 7/1994 | Stanisci | 359/2 |

*Primary Examiner*—Patrick Ryan
*Assistant Examiner*—Abraham Bahta
*Attorney, Agent, or Firm*—Dunlap & Codding, P.C.

[57] ABSTRACT

A microscope slide having a glass plate, a marking surface coating on an area of the glass plate, and indicia formed by etching away portions of the marking surface coating. The marking surface coating may comprise an epoxy resin material, a ceramic material, or any other substance capable of being affixed as a layer onto a glass surface. The indicia may include machine-readable indicia, human-readable indicia, or both machine-readable and human-readable indicia. In order to produce accurate, high-quality indicia, a laser directed by a computer controller may be used to etch away the portions of the marking surface coating.

10 Claims, 2 Drawing Sheets

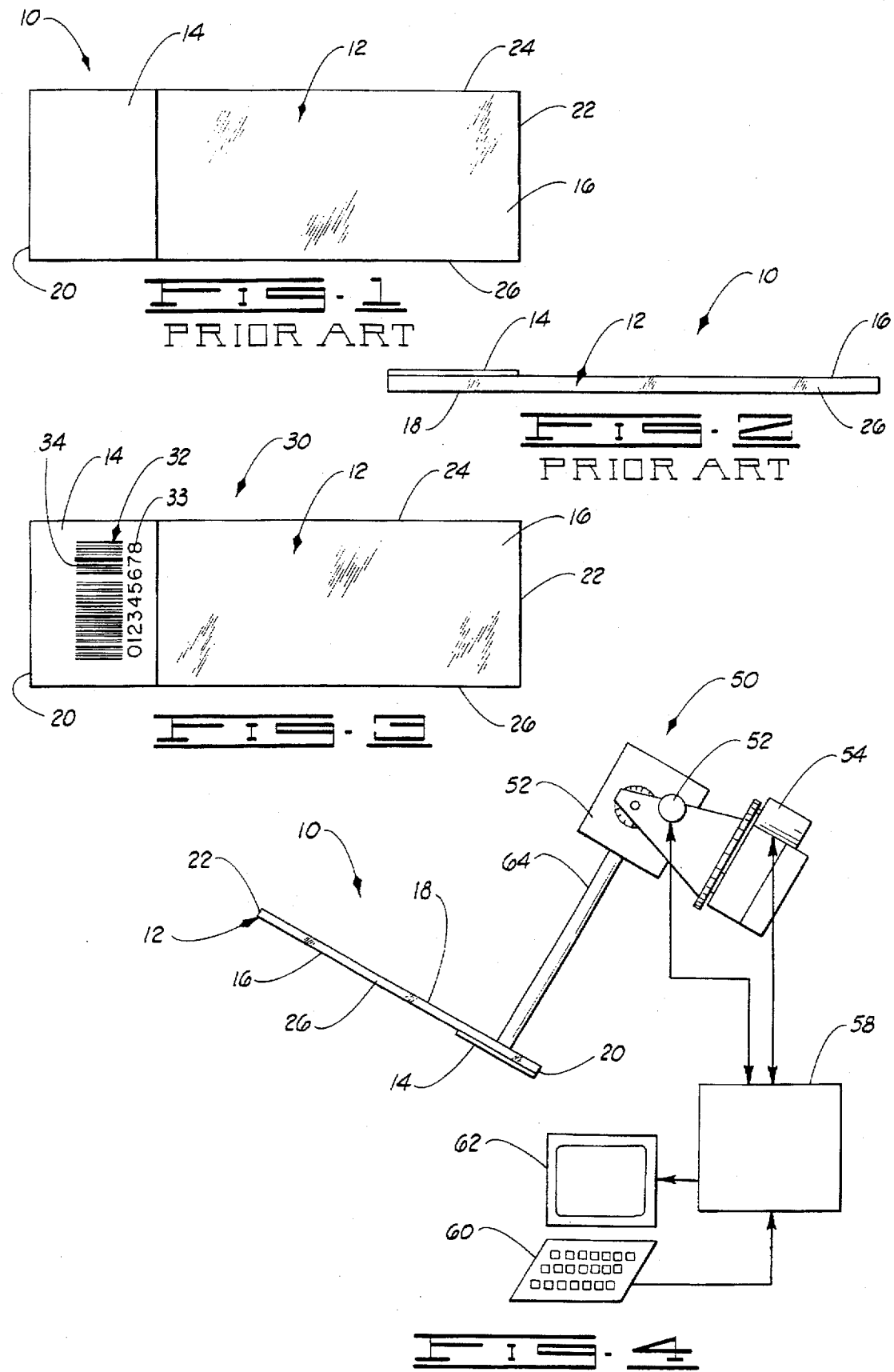

MICROSCOPE SLIDE HAVING BAR CODE INDICIA INSCRIBED THEREON

BACKGROUND OF THE INVENTION

1. Field of the Invention

The present invention relates generally to inscription of images on a surface and particularly, but not by way of limitation, to laser-inscripted bar codes on a glass microscope slide.

2. Description of Related Art

Permanent identification of microscope slides has long been a difficult task. The glass of such slides must be as transparent as possible to facilitate viewing of test samples on the slides under a microscope. As a consequence, marking the slides with hand-written information correlating the test samples with the proper patient presents a challenge.

Further, microscope slides are typically exposed to a wide variety of laboratory solvents, reagents, stains and chemicals, which may remove, blur or obscure critical information on the slides. Consequently, it is important that any marking system for microscope slides be resistant to being dissolved, blurred or obscured by substances used in laboratories.

At the very least, misidentifying a slide destroys professional and public confidence in laboratory test results. Erroneously correlating an abnormal slide with a normal patient may subject a patient and the patient's family to needless anxiety and perhaps unnecessary medical treatment. Conversely, incorrectly identifying a normal slide with an abnormal patient may cause a condition to go untreated and result in debilitation, an excessively long recovery period or even death for the patient.

The possibility of such harsh consequences from misidentifying microscope slides makes an extremely reliable marking system for microscope slides a critical requirement. Thus, a number of devices have been designed over the years for permanently labelling microscope slides.

For example, U.S. Pat. No. 4,481,246, issued to Melisz et al., discloses a microscope slide having a raised marking surface formed of a pigmented resinous material such as epoxy resin, which is absorptive and retentive of marking ink. The epoxy resin accepts the marking of felt-tip pens, india ink, ballpoint pen ink and pencil.

U.S. Pat. No. 4,679,914, issued to Rosenberg, discloses a microscope slide with top and bottom marking surfaces. A raised marking surface formed of pigmented resinous material, such as an epoxy resin, is disposed on one side of the slide and a frosted marking surface is located on the other side of the slide. The frosted marking surface is produced by sand-blasting, acid etching or mechanical abrading.

U.S. Pat. No. 5,111,344, issued to Robinson, Jr., discloses a ceramic-coated microscope slide. This particular slide is made of low annealing temperature glass and has an opaque, porous, ceramic marking surface permanently fused to the glass.

Each of these slides provides a marking surface for identifying information written with pen or pencil. However, none of these slides provides permanent machine-readable indicia for identification of the slide and for verification with hand-written information.

SUMMARY OF THE INVENTION

The present invention is a microscope slide comprising a transparent plate having a marking area in the form of a coating on a portion of the plate. The marking area has etched-away areas of the coating to define indicia which provide identifying information about the sample carried by the microscope slide. The indicia may include machine-readable indicia and/or human-readable indicia.

One object of the present invention is to provide a microscope slide having indelible machine-readable and/or human readable indicia.

Another object of the present invention is to provide a microscope slide having indelible machine-readable indicia which are capable of being scanned by a wide variety of conventional code readers or character recognition machines.

Yet another object of the present invention is to provide an automated method for making a microscope slide having indelible machine-readable and/or human-readable indicia.

Other objects, features and advantages of the present invention are apparent from the following detailed description when read in conjunction with the accompanying drawings and appended claims.

BRIEF DESCRIPTION OF THE DRAWINGS

FIG. 1 is a top view of a prior art microscope slide.

FIG. 2 is a side view of the prior art microscope slide shown in FIG. 1 with the thickness of the marking surface coating exaggerated for purposes of illustration.

FIG. 3 is a top view of a microscope slide constructed in accordance with the present invention.

FIG. 4 is a diagrammatic view of an apparatus and method for making the microscope slide shown in FIG. 3.

DETAILED DESCRIPTION OF THE PREFERRED EMBODIMENTS

Figure 5:
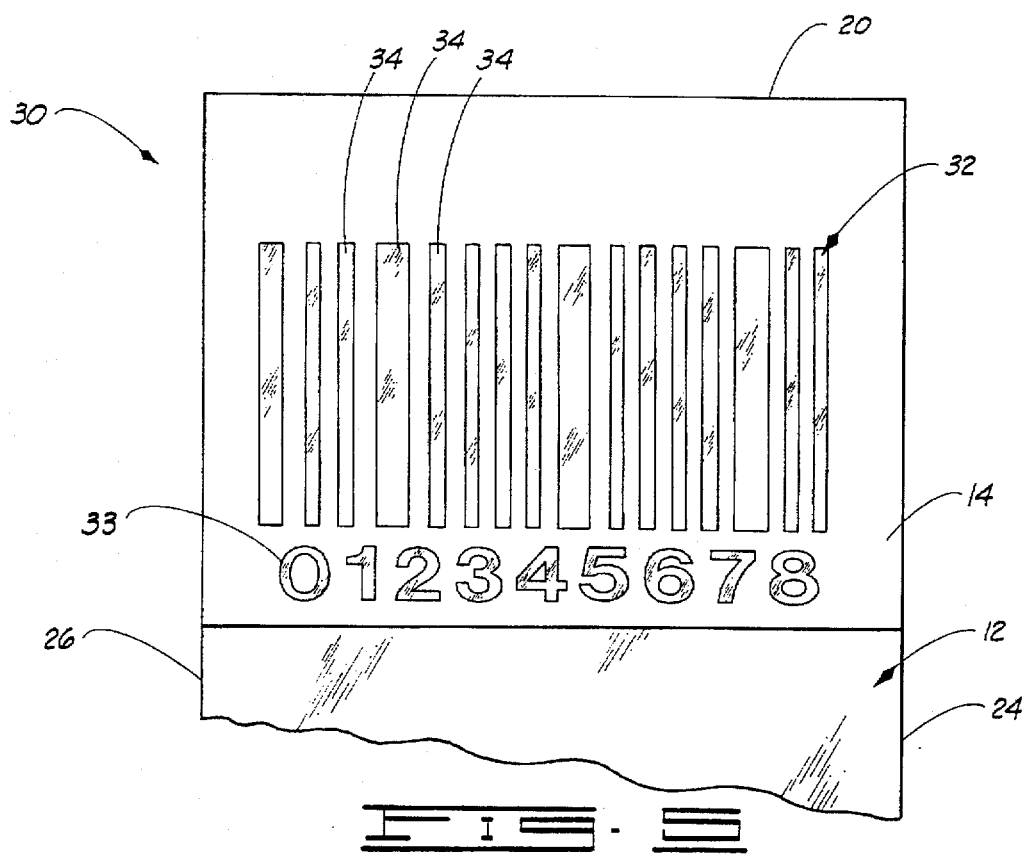
FIG. 5 is a top view of a portion of a microscope slide constructed in accordance with the present invention.

Referring to the drawings in general, and to FIGS. 1 and 2 in particular, shown therein and designated by the general reference numeral 10 is a prior art microscope slide. The microscope slide 10 includes a transparent plate 12, made of soda lime glass or the like, and a marking area 14 affixed as a layer to a portion of the plate 12.

Typically, the plate 12 of the microscope slide 10 has an upper surface 16, a lower surface 18 and an elongated, rectangular shape defined by ends 20 and 22 and sides 24 and 26. Further, it is common that the marking area 14 is located on the upper surface 16 at one end, such as end 20, of the plate 12.

The marking area 14 may be constructed of a variety of materials in a number of ways. For example, the marking area 14 may be a pigmented resinous material, such as an epoxy resin, which dries to a matte finish and which is absorptive and retentive of marking ink. This type of microscope slide is disclosed in U.S. Pat. Nos. 4,481,246 and 4,624,882 issued to Melisz et al., and U.S. Pat. No. 4,679,914, issued to Rosenberg, which are hereby incorporated by reference.

Alternatively, the marking area 14 may be constructed of an opaque ceramic material, which is fused to the glass of the slide 10. This type of microscope slide is disclosed in U.S. Pat. No. 5,111,344 issued to Robinson, Jr., which is hereby incorporated by reference.

Typically, the marking area 14 is provided in a color selected from a range of colors in a color-coding scheme. In this way, the color of the marking area 14 may be used in the classification, storage and retrieval of slides contained in a suitable microscope slide filing system.

All of these prior art microscope slides have a marking surface which is designed to receive indicia hand-written thereon in ink or pencil. As a consequence, these slides are subject to errors resulting from illegibility and transposition of characters.

With reference to FIG. 3, shown therein and designated by reference numeral 30 is a microscope slide constructed in accordance with the present invention. The microscope slide 30 is similar to the prior art microscope slide 10, but has machine-readable indicia 32 etched into the marking surface coating 14. The microscope slide 30 may also include human-readable indicia 33.

It should be appreciated that the machine-readable indicia 32 and the human-readable indicia 33 may be located in the marking area 14 such that space is left in the marking area 14 for the inscription of hand-written information. In this manner, handwritten information may be used with machine-read information from the machine-readable indicia 32 and the human-readable indicia 33 for identity verification of the microscope slide 30.

The machine-readable indicia 32 may comprise a bar code or any other configuration of marks, symbols or characters capable of being read or scanned by machine. Similarly, the human-readable indicia 33 may be one or more numerals, letters, symbols, designs, characters or any combination thereof capable of being discerned by the human eye.

Referring to FIG. 5, shown therein is an enlarged portion of the microscope slide 30. Portions of the marking surface coating 14 are etched away to define a plurality of etched-away strips in the coating 14. Several of the etched-away strips are designated by reference numeral 34 and are generally representative of the etched-away strips in the marking surface coating 14.

The etched-away strips 34 expose the transparent glass plate 12 in a configuration which defines a machine-readable bar code. When read, the bar code may be used to identify the microscope slide 30 with critical information about the sample contained on the microscope slide 30.

As is commonly known, bar codes typically are black lines having widths representative of characters or numbers. In the case of the microscope slide 30, it is the transparent, etched-away strips 34 which define bars having widths representative of characters or numbers.

Because the bars of microscope slide 30 are transparent, it may be necessary to dispose the etched-away strips 34 in front of an opaque surface when using a conventional bar code reader to read the bar code indicia 32 on the microscope slide 30. In other words, it may not be possible for all types of bar code readers to register the bar code indicia 32 of the microscope slide 30 if a suitable background is not provided for the transparent etched-away strips 34. This practice is illustrated by FIG. 3, wherein the transparent, etched-away strips 34 appear as dark bar code lines because a dark background is disposed behind the etched-away strips 34.

Figure 6:
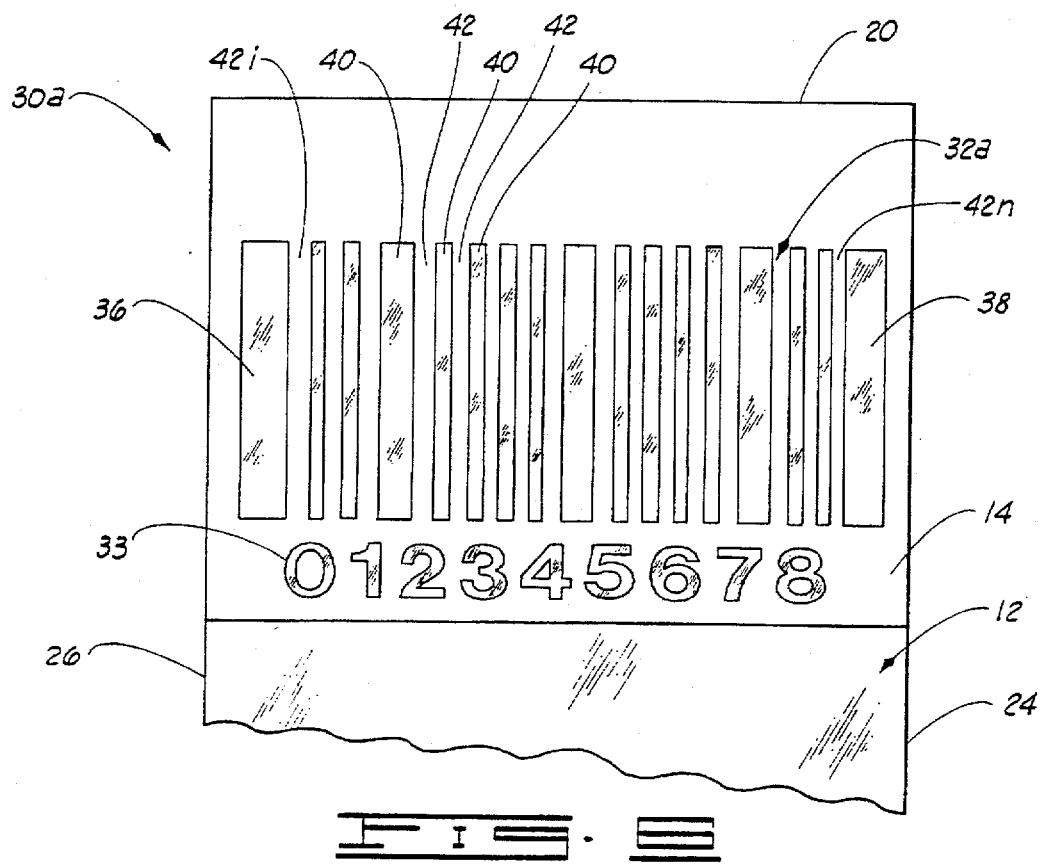
FIG. 6 is a top view of a portion of an alternate embodiment of a microscope slide constructed in accordance with the present invention.

With reference to FIG. 6, shown therein and designated by reference character 30a is an alternate embodiment of a microscope slide constructed in accordance with the present invention. It should be appreciated that only a portion of the microscope slide 30a is shown in FIG. 6.

In the construction of microscope slide 30a, portions of the marking surface coating 14 are etched away to define a plurality of transparent strips in the coating 14. The transparent strips include a left strip 36, a right strip 38, and a plurality of intermediate strips between the left strip 36 and the right strip 38.

Three of the intermediate strips are designated by reference character 40 and are generally representative of the intermediate strips 40 in the coating 14 of the microscope slide 30a. The intermediate strips 40 have widths which provide a representation of characters in the form of a bar code.

In the case of the microscope slide 30a, however, it is the coated spaces between the transparent strips 36, 40 and 38, not the etched-away strips 40 themselves, which are read as bar codes. Two of the coated strips defining bar codes are designated by reference numeral 42 and are generally representative of the bar codes between the etched-away strips 36, 40 and 38.

It should be appreciated that the left strip 36 is not a part of the bar code, but a starting delimiter to define the beginning of the bar code. Thus, the initial bar of the bar code 32a in FIG. 6 is the coated strip indicated by reference character 42i.

Similarly, the right strip 38 is not a part of the bar code, but a stopping delimiter which defines the end of the bar code 32a. Thus, the ending bar of the bar code 32a in FIG. 5 is the coated strip designated by reference character 42n.

It should be appreciated that the microscope slides 30 and 30a are constructed in much the same fashion. The only difference between the microscope slides 30 and 30a is whether a bar code reader scans the transparent, etched-away strips 34 or the coated strips 42 between the bars of the bar code.

In the case of microscope slide 30, the etched-away strips 34 are scanned as the bars of the bar code 32. In the case of microscope slide 30a, the coated strips 42 between the transparent strips 36, 40 and 38 are scanned as the bars of the bar code 32a.

It should be understood that the human-readable indicia 33 of microscope slides 30 and 30a are also defined by etched-away portions of the marking surface coating 14. Portions of the marking surface coating 14 may be etched away in any manner which produces the desired human-readable indicia 33. Further, it should be appreciated that the human-readable indicia 33, as well as the machine-readable indicia, may comprise any suitable pattern or arrangement of exposed glass and coated areas of the microscope slide 30 or 30a.

Making the Microscope Slides

The microscope slides 30 and 30a may be made from any of the conventional slides 10 described hereinabove. Further, the microscope slides 30 and 30a may be made from any other type of slide having at least one coating or layer for a marking surface.

Referring back to FIG. 4, shown therein and designated by reference numeral 50 is an apparatus for making the microscope slides 30 or 30a from a conventional microscope slide 10. The apparatus 50 includes a laser 52, positioning motors 54 and transducers 56, a computer controller 58, an input device 60 and an output device 62.

It should be understood that a suitable assembly (not shown) for supporting the microscope slide 10 in a proper position for etching by the laser 52 is provided. As illustrated by FIG. 4, the laser 52 generates a laser beam 64 which vaporizes selected parts of the coating 14 and produces the transparent strips 34, or the transparent strips 36, 38 and 40.

Since only small strips of the coating 14 are being etched off, a relatively low-power laser 52 may be utilized. However, any type of laser 52 which is capable of vaporizing the coating 14 without damaging the glass 12 of the microscope slide 10 may be used.

Although $CO_2$, eximer and other laser sources may be used, the Nd:YAG (Neodinium:Yttrium Aluminum Garnet) laser is preferred. The Nd:YAG laser is an economical laser source and is suitable in power capability for etching off thin coatings of epoxy resin and ceramic material.

The motors 54, transducers 56, computer controller 58 and input device 60 are operatively connected to the laser 52 to control the movement of the laser beam 64 over the surface of the microscope slide 10. The motors 54 and transducers 56 are connected to the laser 52 and the computer controller 58 to direct the laser beam 64 through a series of location points or coordinates of travel with respect to the microscope slide 10.

The computer controller 58 is connected to the motors 54, transducers 56 and the input device 60 to convert information supplied by an operator through the input device 60 into laser beam 64 movements by the motors 54 and transducers 56. Further, the computer controller 58 actuates changes in the power of the laser beam 64, as required, so that the laser beam 64 may be moved from one point of the microscope slide 10 to another without etching off the coating 14 between the points where no etching is to be done.

Additionally, the computer controller 58 is connected to the output device 62 to display the location of the laser beam 64 with respect to the microscope slide 10. The output device 62 may be a hardcopy device or a display monitor which provides a graphical representation of the etching of the coating 14 as it is being performed.

It should be appreciated that the computer controller 58 includes suitable hardware and software for performing the functions disclosed hereinabove. Suitable hardware and software systems of this type are known to those skilled in the art of controlling laser, etching and engraving operations. Accordingly, additional description of the computer controller 58 is not believed required.

During the laser-etching process, the upper surface 16 of the microscope slide 10 may be disposed toward the laser beam 64. In this way, the laser beam 64 contacts the coating 14 directly.

Alternatively, the lower surface 18, i.e. the surface opposite the coating 14, may be disposed toward the laser beam 64, as shown in FIG. 4. In this manner, the laser beam 64 passes through the glass 12 before contacting the coating 14 from the unexposed side of the coating 14. The glass 12 acts as a shield against vapors produced by vaporizing strips from the coating 14. Thus, laser-etching the bar code 32 or 32a through the glass 12 may be preferred if optimal visibility of the process or control of vapors is desired.

In operation, the operator places the microscope slide 10 in position for laser-etching and inputs information into the input device 60. Preferably, the operator keys in identifying characters in the same form as if such characters were hand-written on the marking surface coating 14 of the microscope slide 10. In fact, the operator may write the identifying characters on the marking surface coating 14 in an area not reserved for the indicia 32, 32a and/or 33 before the indicia 32, 32a and/or 33 are laser-etched into the coating 14.

The computer controller 58 converts the input of the operator to a bar code and generates a sequence of control instructions for laser movements which etch the corresponding indicia 32, 32a and/or 33 into the marking surface coating 14. In response to the control instructions from the computer controller 58, the transducers 52 and motors 54 execute the laser movements.

Additionally, the computer controller 58 may generate messages describing the status of the laser-etching process. These status messages are conveyed to the output device 62 for display to the operator.

Once the indicia 32, 32a and/or 32a are etched into the coating 14, the microscope slide 30 or 30a has been produced. The microscope slide 30 or 30a may then be scanned with a bar code reader.

The scanned data from the bar code indicia 32 or 32a may then be compared with hand-written data on the marking surface coating 14. In addition, the human-readable indicia 33 may be compared with the scanned data and the hand-written data. If a discrepancy exists, then an error was made in producing the indicia 32, 32a and/or 33, or in placing the hand-written data on the marking surface coating 14.

It should be readily apparent that the bar code indicia 32, 32a and/or 33 provide an indelible means for identifying the microscope slide 30 or 32a. Further, the bar code indicia 32 or 32a provide a machine-readable validation of the human-readable indicia 33 and the hand-written identifying data on the microscope slide 30 or 30a. Still further, the indicia 32, 32a and/or 33 provide identifying data which can be relied upon in case hand-written identifying data becomes illegible, erased or obscured.

Changes may be made in the combinations, operations and arrangements of the various parts and elements described herein without departing from the spirit and scope of the invention as defined in the following claims.

What is claimed is:

1. A method of marking a microscope slide, the steps of the method comprising:

providing a microscope slide having an upper surface, a lower surface, and a marking surface formed of a coating affixed to at least a portion of one of the upper and lower surfaces of the microscope slide; and etching into the coating a configuration which exposes a corresponding portion of the microscope slide and thereby defines a substantially permanent identifying indicia in the coating of the microscope slide.

2. The method of claim 1 wherein in the step of providing a microscope slide the coating is a layer of pigmented epoxy resinous material.

3. The method of claim 1 wherein in the step of providing a microscope slide the coating is a layer of opaque ceramic material.

4. The method of claim 1 wherein the configuration is etched into the coating with a laser beam.

5. The method of claim 4 further comprising the step of:

directing the laser beam through the microscope slide prior to contacting the coating.

6. The method of claim 1 wherein the configuration etched into the coating of the microscope slide is a machine-readable indicia.

7. A microscope slide produced by a method comprising the steps of:

provide a microscope slide having an upper surface, a lower surface, and a marking surface formed of a coating affixed to at least a portion of one of the upper and lower surfaces of the microscope slide; and etching into the coating a configuration which exposes a corresponding portion of the microscope slide and thereby defines a substantially permanent identifying indicia in the coating of the microscope slide.

8. The microscope slide of claim 7 wherein the indicia comprise machine-readable indicia.

9. The microscope slide of claim 7 wherein the indicia comprise human-readable indicia.

10. The microscope slide of claim 7 wherein the configuration is etched into the coating by directing a laser beam through the microscope slide prior to contacting the coating.

* * * * *

UNITED STATES PATENT AND TRADEMARK OFFICE
CERTIFICATE OF CORRECTION

PATENT NO. : 5,683,786
DATED : November 4, 1997
INVENTOR(S) : Kavanaugh

Page 1 of 2

It is certified that error appears in the above-identified patent and that said Letters Patent is hereby corrected as shown below:

Drawings, Figure 4, change element "52" to --56-- as indicated below.

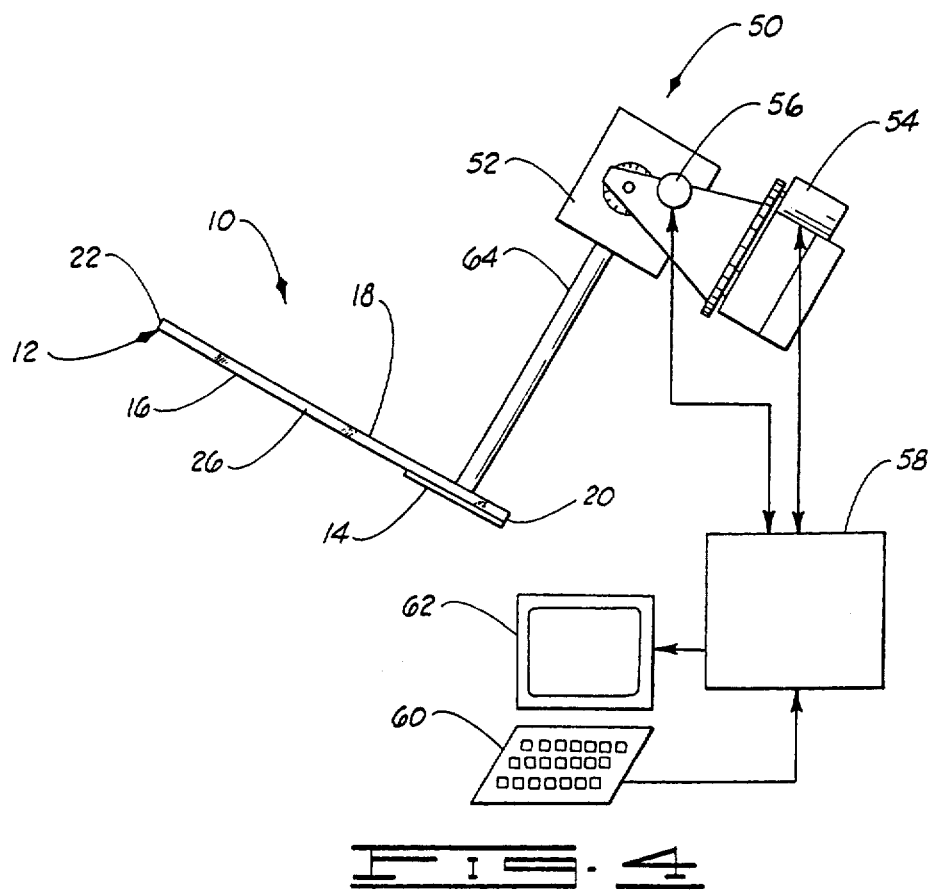

UNITED STATES PATENT AND TRADEMARK OFFICE
CERTIFICATE OF CORRECTION

PATENT NO. : 5,683,786
DATED      : November 4, 1997
INVENTOR(S): Kavanaugh

It is certified that error appears in the above-identified patent and that said Letters Patent is hereby corrected as shown below:

Column 4, line 26, delete "FIG. 5" and substitute therefor --FIG. 6--.

Column 6, line 9, delete "transducers 52" and substitute therefor --transducers 56--.

Column 6, line 15, delete "32, 32a and/or 32a" and substitute therefor --32, 32a and/or 33--.

Column 6, line 30, delete "30 or 32a" and substitute therefor --30 or 30a--.

Signed and Sealed this

Twenty-fifth Day of August, 1998

Attest:

*Attesting Officer*

BRUCE LEHMAN

*Commissioner of Patents and Trademarks*